Nov. 4, 1958  R. B. WILLI  2,859,054
MULTIPLE PASSAGE OVERSHAFT SEAL
Filed May 13, 1955  2 Sheets-Sheet 1

INVENTOR.
RICHARD B. WILLI
BY
Edward Hathaway
ATTORNEY

INVENTOR.
RICHARD B. WILLI
BY
ATTORNEY

United States Patent Office 2,859,054
Patented Nov. 4, 1958

2,859,054

MULTIPLE PASSAGE OVERSHAFT SEAL

Richard B. Willi, Norristown, Pa., assignor to Baldwin-Lima-Hamilton Corporation, a corporation of Pennsylvania Application May 13, 1955, Serial No. 508,184

6 Claims. (Cl. 286—11.15)

This invention relates generally to overshaft seals for transferring fluid between external stationary passages and passages in a rotating shaft.

Seals of this type are generally used on shafts of controllable pitch propellers whose operating mechanism for adjusting the pitch of the propeller blades employ preferably hydraulically actuated pistons and cylinders which require pressure supply and exhaust passages.

A great many overshaft seals for this general purpose have been heretofore suggested and used but they have required an excessive amount of space axially of the shaft because of the necessity to accommodate the required number of external stationary passage connections and to provide sealing elements, spaced axially of the shaft, to separate the sets of passages between the relatively rotating shaft and seal housing. In certain applications of controllable pitch marine propellers such axial space is at a premium.

It is an object of my invention to provide an overshaft seal, of minimum axial length, having a multiplicity of rotating and stationary fluid transfer passages and seals for separating the same.

Another object is to provide an overshaft seal in which the multiplicity of passage and sealing elements are so combined that the necessary plurality of external stationary fluid connections may all lie in a substantially common radial plane.

A further object is to provide an improved overshaft seal of minimum axial length that is relatively simple in construction, operation and maintenance combined with compactness, ruggedness and reliability.

Other objects and advantages will be more apparent to those skilled in the art from the following description of the accompanying drawings in which.

Figure 1:
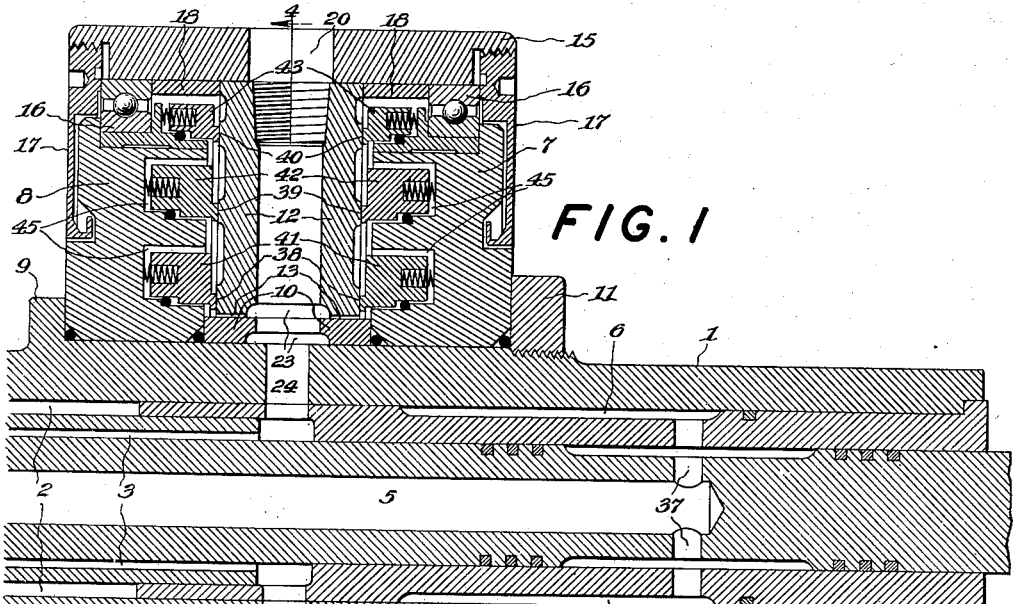
Fig. 1 is a sectional view of my improved overshaft seal taken on line 1—1 of Fig 4 with the position of one stationary passage being shown.

In the particular embodiments of the invention disclosed herein, I have shown in the preferred form, Figs. 1 to 4, inclusive, a rotatable propeller shaft 1 which, it will be understood, carries a controllable pitch propeller (not shown) at one end with a suitable multiple pressure type hydraulic operating mechanism (not shown) for adjusting the propeller blades. The operating fluid is supplied under different pressures to the operating mechanism through suitably formed shaft passages 2 and 3 and returned under an exhaust pressure through a passage 5 which communicates through suitable ports with an annular passage 6. The details of the shaft passage formation per se as well as of the operating mechanism do not constitute a part of my present invention and hence need not be further described.

The overshaft seal essentially comprises two annular end members 7 and 8 securely clamped in spaced relation on shaft 1 between a flange 9, spacing ring 10 and nut 11, and a central stationary annular member 12 slightly spaced at 13 from the spacing ring 10 but mounted in an outer stationary cylindrical housing 15 which is supported preferably by anti-friction bearings 16 on the end members 7 and 8. The outer races of the bearings and the spacing rings 18 are together clamped against the sides of the central stationary member near its periphery by annular clamping members 17 threaded in each end of housing 15. Thus, this central member 12 and outer housing 15 constitute a stationary unit while the end members 7 and 8 form a rotatable unit with the shaft 1.

Figure 3:
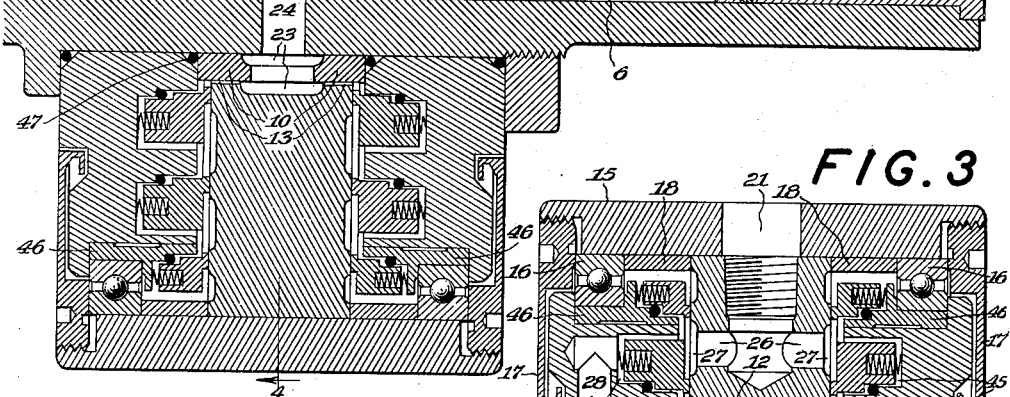
Fig. 3 is another partial sectional view of a third stationary passage of the preferred form.
Figure 4:
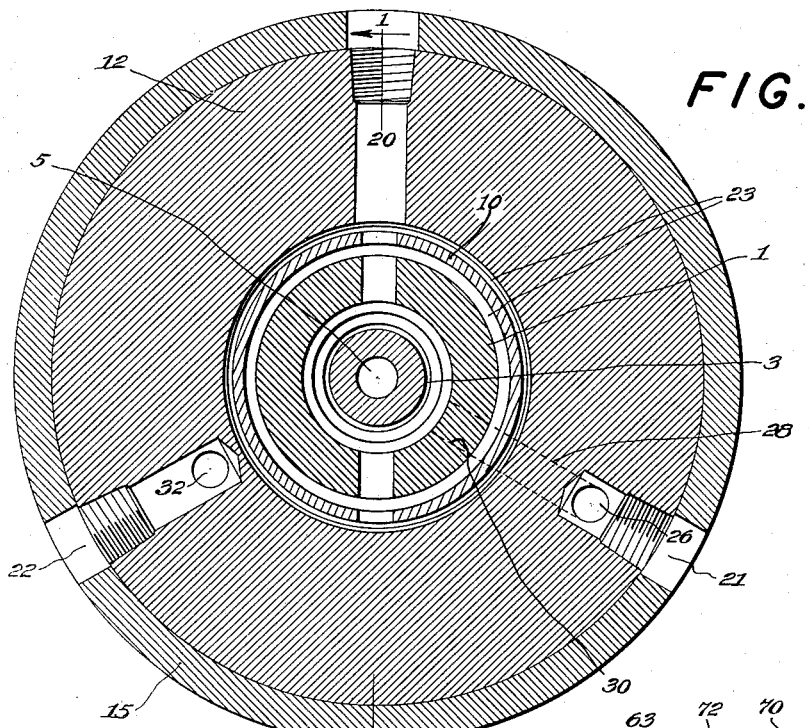
Fig. 4 is a transverse section taken substantially on the line 4—4 of Fig. 1.

Three external passage connections 20, 21 and 22, Fig. 4, extending radially of central member 12 are preferably, but not necessarily, equally spaced apart circumferentially. Supply passage 20, Fig. 1, for, say, high pressure, extends completely through member 12 for direct communication with the shaft passage 3 by way of annular spaces 23 and a port 24 and the second supply passage 21, Fig. 3, for, say, a lesser degree of pressure extends partially through member 12 to communicate through lateral ports 26, annular grooves 27 formed on the side faces of stationary member 12, a radial passage 28, annular passage 29 and port 30 with the shaft passage 2. The third stationary passage 22, Fig. 2, which is preferably the exhaust passage and also extends only partially through member 12, communicates with the central passage 5 of shaft 1 through lateral ports 32, annular grooves 33 formed in the side faces of the center stationary member 12 and thence through a radial passage 34, annular passage 35, port 36, annular shaft space 6 and ports 37, Fig. 1.

To seal the different pressure fluids within their respective passages at points where relative rotation occurs between the end members and the central member, both side faces of the central member 12 are provided with sets of oppositely facing annular sealing lands 38, 39 and 40 against which sets of opposed axially movable annular sealing members 41, 42 and 43 are biased by suitable springs. The annular sealing members 41 and 42 are disposed in annular recesses or pockets 45 formed in the inner faces of the rotating end pieces 7 and 8 while the annular sealing members 43 are disposed in generally L-shaped annular recesses of two rings 46. Suitable annular packing rings 47 are disposed between various adjacent surfaces which have either little or no relative motion whatsoever. Such packing is shown as solid black circles at various points of the sealing elements.

Figure 2:
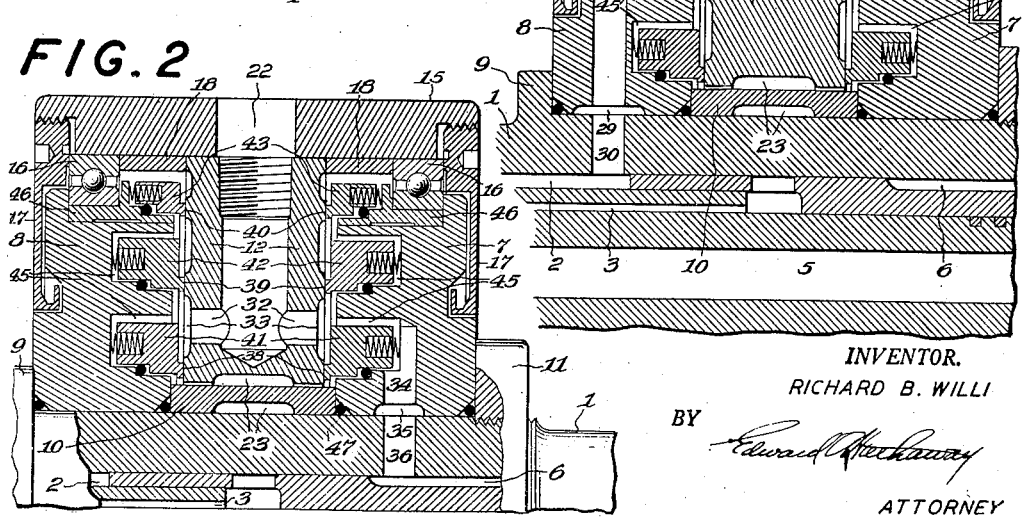
Fig. 2 is a partial sectional view showing the position of a second stationary passage of the preferred form.

The sets of sealing members 41 and 42 are exposed to the fluid in passages 22 and 21 respectively, Figs. 2 and 3, and hence this pressure supplements the spring pressure on the sealing members tending to press them into sealing contact with the sets of stationary sealing surfaces 38 and 39 thereby effectively sealing all three passages 20, 21 and 22 from each other at points where relative rotation is necessary to permit communication of these stationary passages with the passages in the rotating shaft. By having the seals radially stacked, preferably in substantially concentric relation to each other as in this preferred form, it is possible to provide an overshaft seal that has a high degree of axial compactness as well as to allow all external passage connections to lie in a substantially single radial plane at circumferentially spaced points thereof.

It will be understood that the O-ring seals for the face type seals prevents leakage around the back and that the bore of the seal at this point is just slightly less in diameter than the outside diameter of the sealing face. It is this difference in diameter that provides hydraulic force, in addition to spring force, to hold the sealing face against stationary sealing face 38 in the case where the higher pressure is in annular passage 33 and radial port 34. In the case where high pressure exists in annular chamber 23 and sealing is against flow into 33, full pressure will occur inside of the O-ring towards 38. Pressure against the sealing surface diminishes from the inside diameter of the seal face toward the outside diameter, thus giving a pressure differential in this direction, which, plus spring pressure, provides a seal.

Figure 5:
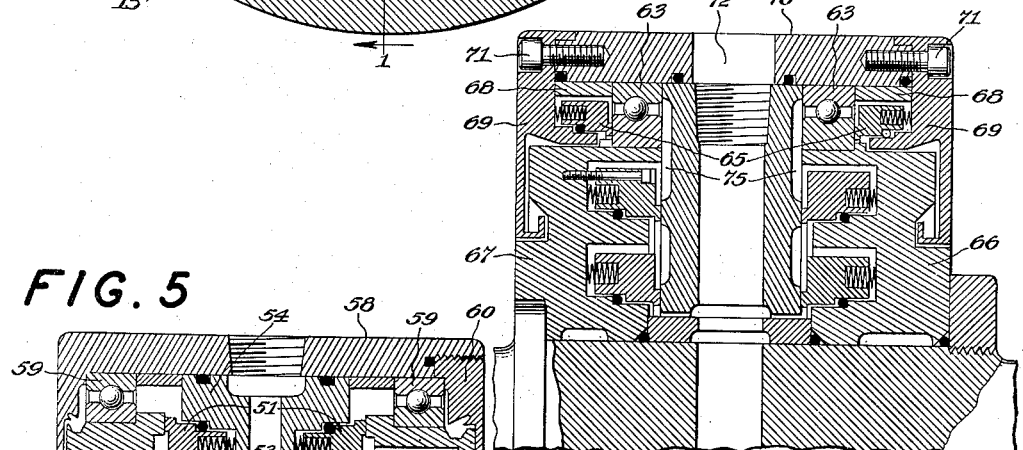
Figs. 5 and 6 are partial sectional views of different modifications.

Hence, there is both a static and dynamic explanation for the sealing principle involved. Fundamentally, the pressure between the rotating and stationary seal faces, tending to spread the faces apart, cannot equal the force pressing them together. In the case where a perfectly lapped seal is present, the high pressure ceases to exist at the entrance to the sealing face. This results in no separating force and the full hydraulic pressure on the applicable annular area acts to hold the seals closed. Let us assume, however, that there is not a perfectly lapped face and that some leakage can escape between the seal faces. In this case Bernoulli's Theorem applies. This principle states that pressure diminishes inversely as the square of the velocity. As applied to any leakage that may occur through the seal faces, there is a very minute opening and, therefore, high leakage velocity and low pressure as compared to the static pressure on the opposite side of the seal. Again in this case a pressure differential exists which tends to hold the seal in a closed position. The same reasoning with regard to the pressure drop through the seal applies whether the high pressure is in chamber 33 on the outside of the seal or in chamber 23 on the inside of the seal.

Where extreme axial and radial compactness is desired the modification shown in Fig. 5 may be employed. Here two sets of the annular sealing members 50 and 51 are disposed in annular recesses 52 and 53 formed in the two faces of the annular stationary central member 54 while the intermediate set of seals 55 are axially offset from members 50 and 51 and are disposed in annular recesses in the rotating end members 56 and 57. The sealing members 50 and 51 thus have sealing contact axially outwardly with the inner faces of the end members 56 and 57 while the sealing members 55 are biased axially inwardly against the annular sealing surfaces of the stationary central passage member 54 thereby maintaining balanced sealing forces. It will also be noted that the axial seals on each side of the stationary annular member have their sealing surfaces lie in common radial planes. The stationary housing 58 is journalled on bearings 59 which are clamped in position in generally the same manner as shown in the preferred form except that the left end of housing 58 is formed integrally with its cylindrical portion thereby permitting the use of a single threaded member 60. This requires that all parts be assembled in the housing from the right end thereof. Suitable packing is shown in black circles wherever necessary. There are three stationary radial external connections lying in a common radial plane and similar to passages 20, 21 and 22 and hence only one such passage is shown. Two of these passages communicate with the annular spaces 52 and 53 through radial passages (not shown) in the same manner as shown for passages 21 and 22 in Figs. 2 and 3, hence, it is not necessary to show these additional passages. It will also be understood that the passage connections in the shaft passages are the same as in the preferred form. While the modification of Fig. 5 has maximum compactness, yet, it is somewhat more complicated than the other arrangements shown herein.

Figure 6:
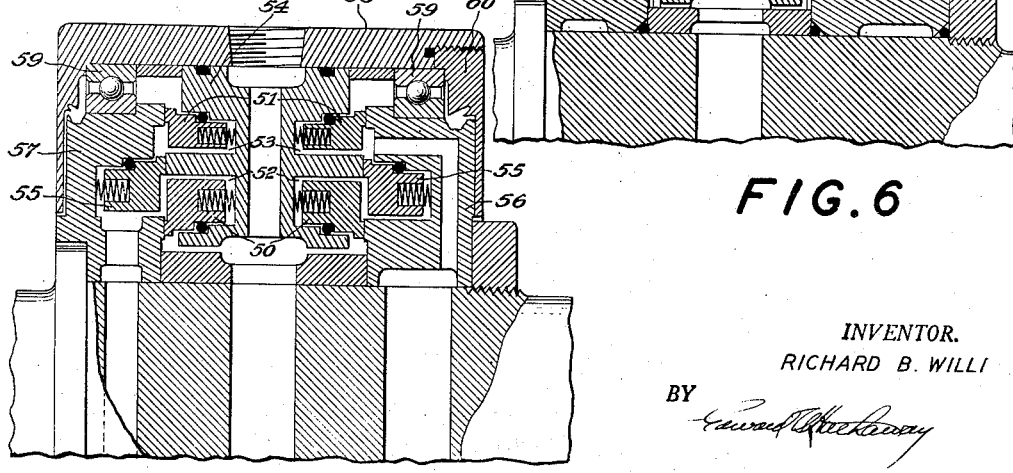

In the modification of Fig. 6 the ball bearings on which the stationary housing is journalled are arranged to run continuously in the operating oil passing through one of the transfer passages. To accomplish this the two innermost sets of annular seals corresponding to members 41 and 42 of Fig. 2 are constructed and arranged within their rotating end members similar to that shown in Fig. 2, while the outermost set of annular sealing members 65 are disposed in suitable annular recesses within the stationary housing to seal axially inwardly against the inner ballbearing races which are supported on the periphery of the rotating annular end members 66 and 67. Annular spacing rings 68 are interposed between the outer bearing races and the annular clamping members 69 which are secured to the housing 70 by stud bolts 71. In this modification there are three external passage connections lying in a common plane and one of which, 72, corresponding to passage 20 and the other two of which are not shown because they are identical to passages 21 and 22 of the preferred form. The bearings 63 are continuously subjected to an oil bath by reason of the annular grooves 75 being sufficiently radially enlarged compared to the annular space 27 of the preferred form so as to communicate with the ball races. Oil leakage will not occur from the housing because of the uppermost seal 65 being located outside of the ballbearings and suitably sealed by packing glands indicated by solid black circles.

From the foregoing disclosure of the several modifications it is seen that I have provided a very compact, yet rugged and effective seal in which complete axial balance is obtained by having the sealing members of each set opposed to each other although under certain circumstances, and in the broader aspects of the invention, sealing members can be used on only one side of the radial passage annulus 12 but this would sacrifice the very desirable advantage of the balanced seal feature. In each modification the external passage connections may all enter the seal in a single radial plane and the number of transfer passages, each under their own pressure, may be more or less than the three shown, without any increase in the axial length of the overshaft seal. In all three forms the sets of seals are disposed at different radial distances between the adjacent sides of the annular members and in the preferred form they are also concentric to each other. One feature which lends compactness to my seal is that the annular recesses for containing the axially movable sealing elements are also used as part of the passage means for laterally connecting the radial stationary passages with the radial rotating passages. Broadly, the passage means for laterally connecting the stationary and rotating radial passages e. g. 21 and 28, includes the annular grooves, recesses and ports previously described.

It will, of course, be understood that various changes in details of construction and arrangement of parts may be made by those skilled in the art without departing from the spirit of the invention as set forth in the appended claims.

I claim:

1. An overshaft seal comprising, in combination a stationary annular member having a plurality of circumferentially spaced radial passages, one of said passages extending entirely through said stationary member for communication with a shaft passage, another of said radial passages extending only partially through said stationary member from the periphery thereof, a rotatable annular member disposed adjacent to one side of the stationary member and being rotatable with the shaft and having a radial passage therein for communication with the shaft, lateral passage means extending from said partial radial passage in the stationary annular member to the radial passage in the rotatable annular member, and a plurality of axially movable annular sealing means disposed between said stationary and rotatable annular members at different radial distances on each side of said lateral passage means to provide a seal on each side thereof and to seal the inner end of the through-passage in the stationary annular member against communication with said lateral passage means.

2. An overshaft sealing device comprising, in combination, a stationary annular member having a plurality of circumferentially spaced radial passages, one of said passages extending entirely through said stationary member for communication with a shaft passage, other of said radial passages being of different distances and extending only partially through said stationary annular member from the periphery thereof, a rotatable annular member disposed adjacent to one side of the stationary annular member for rotation with a shaft, said rotatable member having radial passages of different lengths communicating with the shaft and extending only partially through said rotatable member outwardly from the shaft end thereof, lateral passage means extending through said stationary annular member from the longest partial radial passage therein to the shortest radial passage in the rotatable member, lateral passage means connecting the next shortest radial passage in the stationary means with the next longest radial passage in the rotatable member, and axially movable annular seals interposed between said rotatable and annular members on each side of each lateral passage means to prevent communication therebetween and to prevent communication from the through-passage of the stationary member to said lateral passage means, said lateral passage means and said sealing means thereby being successively disposed at several increasing radial distances so as to be radially stacked to minimize the axial length of the sealing device.

3. A shaft sealing device comprising, in combination, an annular member having a plurality of circumferentially spaced radial passages of different lengths and extending only partially through said stationary annular member from the periphery thereof, a rotatable annular member disposed adjacent to one side of the stationary annular member for rotation with a shaft, said rotatable member having radial passages of different lengths communicating with the shaft and extending only partially through said rotatable member outwardly from a shaft, lateral passage means extending through said stationary annular member from the longest radial passage therein to the shortest radial passage in the rotatable member, lateral passage means connecting the next shortest radial passage in the stationary means with the next longest radial passage in the rotatable member, and axially movable annular seals interposed between said rotatable and annular members on each side of each lateral passage means to prevent communication therebetween, said lateral passage means and said sealing means thereby being successively disposed at increasing radial distances so as to be radially stacked to minimize the axial length of the sealing device.

4. The combination set forth in claim 1 further characterized in that means are provided for supporting one of said sealing means in a position that is axially offset from another of the sealing means and is also radially offset therefrom so as to overlap the same in a radial direction, and all of the sealing means have a sealing surface lying substantially in a common radial plane.

5. The combination set forth in claim 1 further characterized in that means are provided for supporting one of the axially movable means in a position that is axially offset from another of the sealing means.

6. The combination set forth in claim 1 further characterized in that means are provided for supporting one of the axially movable means in a position that is axially offset from another of the sealing means but all of the sealing means have sealing surfaces lying substantially in a common radial plane.

References Cited in the file of this patent
UNITED STATES PATENTS

| | | |
|---|---|---|
| 872,358 | Liddell | Dec. 3, 1907 |
| 888,658 | Schroeder | May 26, 1908 |
| 2,270,927 | Browne | Jan. 27, 1942 |
| 2,653,833 | Barron | Sept. 29, 1953 |